June 14, 1949.  R. S. ROBBINS ET AL  2,473,303

SWITCH

Filed Aug. 24, 1945

INVENTORS
Rolland S. Robbins
Carl T. Cochran
By Hawgood & Van Horn
Their Attorneys Patented June 14, 1949

2,473,303

UNITED STATES PATENT OFFICE 2,473,303

SWITCH

Rolland S. Robbins and Carl T. Cochran,
Lakewood, Ohio

Application August 24, 1945, Serial No. 612,432

1 Claim. (Cl. 200—16)

Our invention relates to a safety device for automotive vehicles, stationary engines of the internal combustion type, and the like, and pertains more particularly to a cut-out or ground switch operating to open the battery circuit and to ground or open the generator or distributor circuit of such mechanism.

It is one of the objects of the present invention to provide a device of this character which is of simple and compact construction, positive in its operation and inexpensive to manufacture.

Another object is to produce a device of this character which is provided with a single, movable contact operating in one direction to open a battery circuit and to ground a generator circuit where the device is employed in a power plant having both circuits.

Another object of the invention is the provision of means for remote operating control of the switch.

A further object is to prevent fires due to short circuits and also to prevent unauthorized operation of the power plant.

A still further object of the invention is to provide an operating mechanism for the switch by which the movable contact may, when desired, be held out of its normal battery circuit closing position.

Other objects and advantages of our invention will become more apparent as the following description of an embodiment thereof progresses, reference being made to the accompanying drawing in which like reference characters are employed to designate like parts throughout the same.

Figure 1:
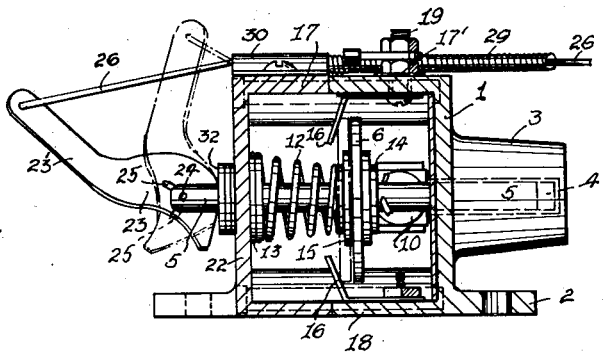
Figure 1 is a side view of a switch embodying our invention shown partly in vertical section.

It is not uncommon for destructive fires to start in automotive vehicles due to short circuits or grounds in the battery circuit. Furthermore, the theft of an automobile may be accomplished, even if the battery circuit is disconnected, by pushing the vehicle in gear to cause the generator to generate and deliver sufficient current and voltage for the operation of the vehicle and its lights.

By our invention we have produced a device which will insure the owner against such conditions, by providing means whereby the battery circuit may readily be disconnected entirely by opening the battery circuit, such means being also operable to render the generator ineffective.

The embodiment of the invention illustrated in the accompanying drawing includes a casing 1 which comprises a hollow body having a base 2 integral therewith along the bottom wall by which the casing may be attached to a support. One wall of the casing has a projection 3 formed integral therewith and which is provided with an inner bore 4 for receivig and guiding rod 5 on which the movable switch element or contact 6 is carried within the casing. A pair of binding posts 7 and 8 are insulated at 9 from the casing and project therethrough terminating within the casing in a pair of contacts 10 and 11, respectively. These contacts are disposed opposite one another within the casing and are located within the path of movement of the movable contact 6 within the casing. The contact 6 is normally urged into contact with the contacts 10 and 11, respectively, by means of a compression spring 12 axially arranged on the rod 5 and having one end in engagement with a wall 13 of the casing and its other end in engagement with one of the nuts 14. The contact 6 is rigidly mounted on the rod 5 by means of the nuts 14 carried on opposite sides of the contact 6, the contact being insulated on the rod 5 and from the nuts 14 by means of an insulating sleeve 15.

Spring contacts 16 are mounted on the top and bottom walls of the casing 17 and 18, respectively, one of the contacts 16 being secured to the casing by means of a binding post 19 projecting through the upper wall 17 and insulated at 17' therefrom for receiving a wire 20 leading from a distributor or generator, when the power plant includes a generator circuit. Since the casing 1 is mounted on a part of the chassis of an automobile when used in connection with such a vehicle, the casing is, therefore, connected to the ground circuit thereof as is indicated at 21 in Figure 5.

Figure 2:
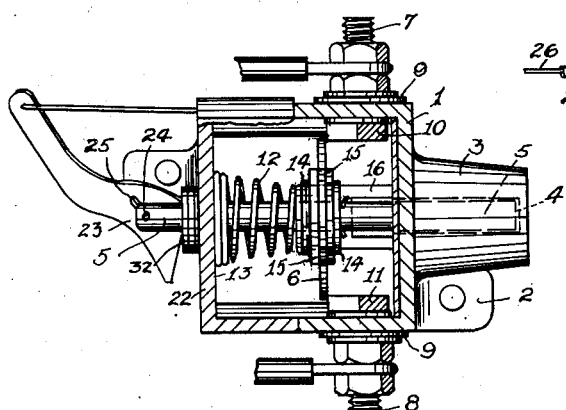
Figure 2 is a view similar to that shown in Figure 1 but shows the device rotated 90° about its axis.

One end of the rod 5 operates in the bore 4 formed in the projection 3, while the other end operates in an opening formed in the opposite wall 22 of the casing and projects therefrom as shown in Figures 1 and 2. The projecting end of the rod 5 is preferably bifurcated to receive a cam lever 23. This lever is pivotally and slidably mounted in the bifurcated end of the rod as shown, the pivot pin 24 operating in the slot 25 of the cam lever in a manner which will be described presently.

Figure 3:
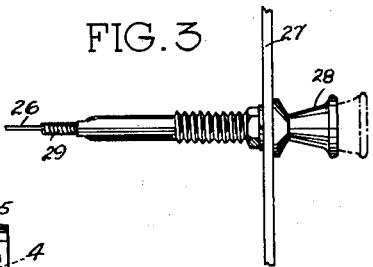
Figure 3 is a side view of the forward end of a Bowden cable mounted on a support and having an operating knob shown in full line position when the battery circuit is closed and shown in dotted lines to indicate this position of the knob when the said circuit is open.
Figure 4:
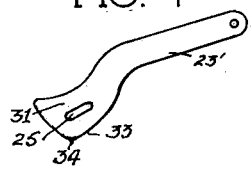
Figure 4 is a detail side view of a cam lever having connection with the other end of the Bowden cable for operating the switch plunger.

The switch or cut-out is operated remotely by any convenient means such as a Bowden cable 26. One end of the cable is mounted upon a support 27, as shown in Figure 3, and terminates in an operating knob 28, the location of the knob being within convenient reach of the operator of the automobile. The other end of the Bowden cable is pivotally attached to the cam lever, the cable casing 29 being clamped on the casing 1 by means of a clamping member 30.

The cam lever is provided with an arm 23' and a cam portion 31, the latter being engageable with a hardened disc 32 carried by the casing 1 and through which the outer end of the rod 5 operates. The cam lever is provided for the purpose of actuating the movable contact 6 on the rod 5 in a direction against the compression of the spring 12, as is indicated in broken lines in Figure 1 when the operator pulls the knob 28 to the right or broken line position in Figure 3. In so doing the rear face 33 of the cam is in engagement with the disc 32, the high point 34 of the cam having passed a dead center position with respect to the pin 24. As the cam approaches this broken line position, the cam lever will be shifted bodily so that the pin 24 will slide along the slot from the position shown in full lines in Figure 1 to the position shown in dotted lines of that figure. In this manner the movable contact 6 is brought into electrical contact with the ground contact 16 against the compression of spring 12 and is held in that position against accidental displacement. However, when the operator desires again to close the battery circuit by permitting the movable contact 6 to return under the compression of spring 12 to engagement with the insulated contacts 10 and 11 and thus close the battery circuit, it is merely necessary to push the knob 28 from its broken line position in Figure 3 to the solid line position. In so doing, the cam lever 23 is rocked in a counter-clockwise direction in Figure 1 to its full line position whereupon the high point 34 of the cam will pass the dead center position with respect to the pin 24 and the pin will then ride in the lower end of the slot 25 as shown in Figure 2.

Figure 5:
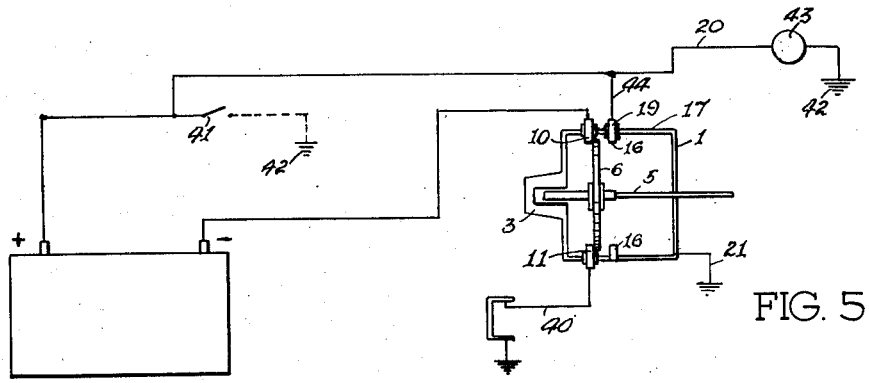
Figure 5 is a diagrammatic view illustrating one manner in which the device may be connected in a battery and generator or distributor circuit.

Referring more particularly to Figure 5, we have shown diagrammatically the switch applied in use in connection with an automobile power plant, the switch being shown connected in one position in the negative or ground side of a storage battery, and in its other position to ground a generator or distributor circuit. When the contact 6 is in the position shown in this figure the battery circuit is closed through the negative side to ground at 40, the positive side being closed through an ignition switch or stationary switch 41 and the customary secondary circuits to generator, ignition and lights and finally to ground 42. In order to ground the generator 43 through the switch 1 when the battery circuit is opened by pulling the knob 28 to its dotted line position in Figure 3, the wire 20 is connected to the insulated post 19 by means of a wire 44.

Various changes may be made in the details of construction and arrangement of parts without departing from the invention or the scope of the appended claim.

We claim:

A device of the class described comprising a casing, a pair of battery circuit contacts insulated from the casing and mounted on opposite sides thereof, a movable contact adapted to bridge said first contacts, compression means normally urging said movable contact into engagement with said pair of contacts, a generator battery circuit contact insulated from said casing and engageable by said movable contact when the latter is moved to its limit of motion in a direction to disengage said battery circuit contacts and against the urge of said compression means, a rod in said casing carrying said movable contact, and a cam lever having pivotal and sliding engagement with an end of said rod to move the rod in opposite directions, said cam lever having a slot therein, a pin carried by said rod end and operating in said slot, the cam portions of the lever having front and rear face portions embracing an intermediate heel or high point portion, said cam slot being so positioned relative to said high point that movement of the lever to its limit of movement in either direction will urge said pin to one respective end of said slot past a dead center position to thereby hold the movable contact in its respective limits of movement and in contact with one or the other of said battery or generator circuit contacts, and means for moving said cam lever.

ROLLAND S. ROBBINS.
CARL T. COCHRAN.

REFERENCES CITED

The following references are of record in the file of this patent:

UNITED STATES PATENTS

| Number | Name | Date |
|---|---|---|
| 867,509 | Johnson | Oct. 1, 1907 |
| 1,656,952 | Nutt | Jan. 24, 1928 |
| 1,736,991 | Adam | Nov. 26, 1929 |
| 1,935,509 | Leeah et al. | Nov. 14, 1933 |
| 1,942,115 | Milone | Jan. 2, 1934 |